(12) United States Patent
Huang et al.

(10) Patent No.: US 10,714,944 B2
(45) Date of Patent: Jul. 14, 2020

(54) CHARGER CIRCUIT AND POWER CONVERSION CIRCUIT THEREOF

(71) Applicant: RICHTEK TECHNOLOGY CORPORATION, Zhubei, Hsinchu (TW)

(72) Inventors: Wei-Jen Huang, New Taipei (TW); Tsung-Han Lee, Taoyuan (TW); Shun-Yu Huang, Nanto (TW); Chun-Kai Chang, Chiayi (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 4 days.

(21) Appl. No.: 16/167,392

(22) Filed: Oct. 22, 2018

(65) Prior Publication Data

US 2019/0252896 A1 Aug. 15, 2019

(30) Foreign Application Priority Data

Feb. 13, 2018 (TW) .............................. 107105321 A (51) Int. Cl.
 *H02J 7/00* (2006.01)
 *H02M 3/00* (2006.01)
 *H02J 7/02* (2016.01)

(52) U.S. Cl.
 CPC .............. *H02J 7/00* (2013.01); *H02J 7/0045* (2013.01); *H02J 7/022* (2013.01); *H02M 3/00* (2013.01); *H02J 2207/20* (2020.01)

(58) Field of Classification Search
 CPC ........ H02J 7/0052; H02J 7/022; H02J 7/0045; H02J 2007/0059; H02J 2007/0062; H02J 7/00; H02J 2207/20; H02M 3/00; H02M 3/158

See application file for complete search history.

(56) References Cited

U.S. PATENT DOCUMENTS

| | | | |
|---|---|---|---|
| 9,197,132 B2 * | 11/2015 | Artusi | H02M 1/4225 |
| 9,768,678 B1 * | 9/2017 | Stanley | H02M 3/158 |
| 2007/0085523 A1 * | 4/2007 | Scoones | H02M 3/158 |
| | | | 323/314 |
| 2007/0296383 A1 * | 12/2007 | Xu | H02M 1/14 |
| | | | 323/282 |
| 2008/0055946 A1 * | 3/2008 | Lesso | H02M 3/158 |
| | | | 363/63 |

(Continued)

*Primary Examiner* — Nha T Nguyen
(74) *Attorney, Agent, or Firm* — Tung & Associates (57) ABSTRACT

A charging circuit includes a power conversion circuit, an inductor, and at least one conversion capacitor. The power conversion circuit includes a conversion switch circuit and a conversion control circuit. The conversion switch circuit includes an upper switch, a lower switch, and at least one auxiliary switch. In a switching conversion mode, the conversion control circuit operates the conversion switch circuit to switch the inductor to plural voltage levels repetitively for converting an input power to a charging power to charge a battery by switching power conversion. In a capacitive conversion mode, the conversion control circuit operates the conversion switch circuit to switch the conversion capacitor between two of voltage division nodes periodically for converting the input power to the charging power by capacitive power conversion.

21 Claims, 4 Drawing Sheets

(56) References Cited

U.S. PATENT DOCUMENTS

| | | | |
|---|---|---|---|
| 2013/0038289 A1* | 2/2013 | Tse | H02M 3/158 320/118 |
| 2013/0234513 A1* | 9/2013 | Bayer | G05F 1/577 307/31 |
| 2016/0149478 A1* | 5/2016 | Low | H02M 3/073 323/311 |
| 2018/0115157 A1* | 4/2018 | Chan | H02J 1/00 |

* cited by examiner

CHARGER CIRCUIT AND POWER CONVERSION CIRCUIT THEREOF

CROSS REFERENCE

The present invention claims priority to TW 107105321, filed on Feb. 13, 2018.

BACKGROUND OF THE INVENTION

Field of Invention

The present invention relates to a charger circuit, particularly to a charger circuit including a switching power conversion mode and a capacitive power conversion mode. The present invention also relates to a power conversion circuit and a charging control method for use in the charger circuit.

Description of Related Art

The following prior art documents are relevant to the present invention: "A 50 MHz 5V 3 W 90% Efficiency 3-Level Buck Converter with Real-Time Calibration, Xun Liu et. al, 2016 Symposium on VLSI Circuits Digest of Technical Papers"; "Analysis and Design Considerations of Integrated 3-Level Buck Converters, Xun Liu et. al,, IEEE TRANSACTIONS ON CIRCUITS AND SYSTEMS Vol. 63, No. 5, May 2016" and "Constant ON-Time 3-Level Buck Converter for Low Power Applications, Brian M. Cassidy et. al, IEEE, 2015".

Figure 1:
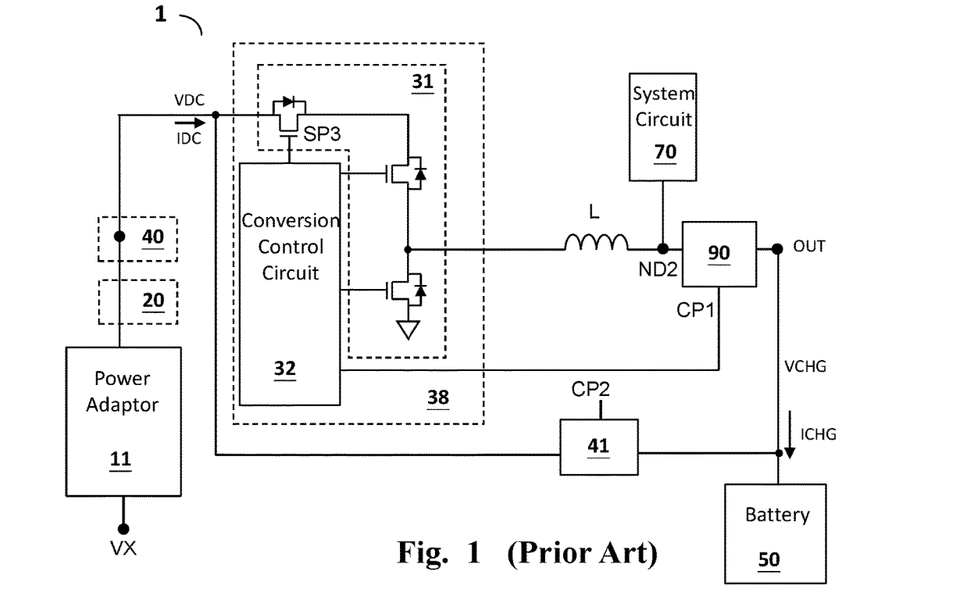
FIG. 1 shows a schematic diagram of a prior art charger circuit having a direct charging function.

FIG. 1 shows a prior art charger circuit (charger circuit 1). The charger circuit 1 includes a power adaptor 11 which is able to provide a "direct charging" function. In direct charging mode, the power adaptor 11 provides a DC current IDC or a DC voltage VDC to charge a battery 50 by a constant current (CC mode) or a constant voltage (CV mode) through a cable 20 (such as a USB cable), wherein the charging current ICHG is substantially equal to the DC current IDC. On the other hand, when the charger circuit 1 operates in a switching power conversion mode, the switching power conversion circuit 38 converts the DC voltage VDC (which is, e.g., 5V, 9V or 12V VBUS voltage defined in USB PD specification) to the charging current ICHG or the charging voltage VCHG, to charge the battery 50. In this latter case, it is possible for the charging current ICHG to be larger than the DC current IDC.

The prior art in FIG. 1 has the following drawbacks. First, in direct charging mode, when a standard cable compliant with USB specification is used, such standard cable has a relatively lower limit for charging current (such as maximum 5A), so the charging time required is long. If it is desired to raise the charging current, for example to 8A or higher, a specially-designed fast charging cable with a larger diameter is required. However, it is inconvenient to use the fast charging cable because it is a non-standard cable which is not compatible for other uses, and it is less flexible for accommodation due to its larger diameter. Second, in switching power conversion mode, although it is possible for the charging current ICHG to be larger than the DC current IDC, to provide a relatively larger charging current ICHG, it would be difficult to select an appropriate inductor and appropriate power switches to achieve an optimized balance among different requirements such as charging current amount, current ripple amplitude, conduction resistance of the power switches, power conversion efficiency, etc.

In comparison with the prior art in FIG. 1, the present invention is advantageous in that the switching power conversion mode and the capacitive power conversion mode share the same power conversion switches; the charger circuit can charge the battery by a high charging current to reduce the charging time, while a standard cable such as one compliant with USB specification can be used wherein the current through the cable is not required to be high. Thus, the present invention has both merits of the switching power conversion mode and the capacitive power conversion mode, and because the two modes share the same power conversion switches, the cost is reduced.

SUMMARY OF THE INVENTION

From one perspective, the present invention provides a charger circuit having a switching power conversion mode and a capacitive power conversion mode, and configured to convert a first input power to a charging power at an output node to charge a battery, wherein the first input power includes an input voltage and an input current, the charger circuit comprising: a loop switch circuit coupled between a first node and the output node; a power loop transistor coupled between a second node and the output node; an inductor connected in series with the power loop transistor, and coupled between a third node and the second node; a power conversion circuit coupled with the loop switch circuit at the first node, and coupled with a current inflow end of the inductor at the third node, the power conversion circuit including: a conversion switch circuit, including: an upper switch; a lower switch; and at least one auxiliary switch coupled with the upper switch and the lower switch; wherein each of the upper switch, the lower switch and the at least one auxiliary switch is coupled between at least two of the first input power, the first node, the third node and a ground node; and a conversion control circuit, configured to operably generate a conversion switch control signal to control the conversion switch circuit, and generate a loop control signal to control the loop switch circuit and the power loop transistor; and at least one conversion capacitor, coupled to the conversion switch circuit; wherein, in the switching power conversion mode, the loop switch circuit is controlled to be OFF, and the conversion control circuit controls the upper switch SU, the lower switch and the at least one auxiliary switch, cycle by cycle repetitively, to conduct a current inflow end of the inductor to plural voltage levels in corresponding plural periods within each cycle, so as to convert the first input power to a switching output voltage at the second node by switching power conversion, and the conversion control circuit controls the conduction of the power loop transistor to convert the switching output voltage to the charging power; and wherein, in the capacitive power conversion mode, the loop switch circuit is controlled to be ON, and the conversion control circuit controls the upper switch, the lower switch and the at least one auxiliary switch, so that in plural charging conversion periods, the at least one conversion capacitor is periodically coupled between two of the following nodes: at least one voltage division node, the input power, and the ground node, so as to convert the input power to the charging power by capacitive power conversion, wherein the first node is coupled to one of the at least one voltage division node.

In one embodiment, in the capacitive power conversion mode, the charging current has a level which is substantially equal to a level of the input current multiplied by a predetermined current factor which is a real number larger than 1, and/or the charging voltage is substantially equal to a level of the input voltage multiplied by a predetermined voltage ratio which is a positive real number smaller than 1.

In one embodiment, the charger circuit further comprises a power delivery unit configured to operably convert a second input power to the first input power, wherein the power delivery unit regulates the input voltage at a predetermined voltage level, or regulates the input current at a predetermined current level.

In one embodiment, each of the upper switch, the lower switch and the at least one auxiliary switch has an average current passing through, and the average current is a function of the charging current, both in the switching power conversion mode and in the capacitive power conversion mode.

In one embodiment, the first node and the third node are directly connected with each other.

In one embodiment, the charger circuit further comprises a connector or further comprising a connector and a cable, for coupling the power delivery unit with the power conversion circuit, wherein the power delivery unit, the connector and the cable are compliant with a USB PD specification, and/or a USB type-C specification, and/or a USB quick charge specification.

In one embodiment, the at least one auxiliary switch includes a first auxiliary switch and a second auxiliary switch; the upper switch and the first auxiliary switch are connected in series and are coupled between the input power and the first node, wherein the upper switch and the first auxiliary switch are connected with each other at a fourth node; the lower switch and the second auxiliary switch are connected in series and are coupled between the first node and the ground node, wherein the lower switch and the second auxiliary switch are connected with each other at a fifth node; the conversion capacitor is coupled between the fourth node and the fifth node; the third node is directly connected to the first, fourth or fifth node; the plural charging conversion periods include a first conversion period and a second conversion period, and in the capacitive power conversion mode, the conversion control circuit controls the conversion switch circuit, such that a first end of the conversion capacitor is electrically connected to the input voltage and the first node in the first and second conversion periods, respectively, and a second end of the conversion capacitor is electrically connected to the first node and the ground node in the first and second conversion periods, respectively, such that the charging current is substantially twice of the input current.

In one embodiment, the third node is directly connected to the first node, and in the capacitive power conversion mode, when the circuit is in stable state, a voltage level at the third node is substantially a constant DC level.

In one embodiment, at least one or both of the loop switch circuit and the power loop transistor, are integrated with the power conversion circuit in an integrated circuit chip and/or packaged in an integrated circuit package.

In one embodiment, in a direct charging mode, the conversion control circuit operates the conversion switch circuit, the loop switch circuit and the power loop transistor, to conduct a direct current path from the first input power to the charging power.

In one embodiment, in the switching power conversion mode, a current inflow end of the inductor switches between the input voltage and the ground node, to perform a 2-level switching power conversion.

In one embodiment, the third node is directly connected to the first node, and in the switching power conversion mode, a current inflow end of the inductor switches among the input voltage, the ground node and a third voltage level, to perform a 3-level switching power conversion, wherein the third voltage level is obtained by switching the conversion capacitor.

In one embodiment, in the switching power conversion mode, a current inflow end of the inductor switches among the input voltage, the ground node and a third voltage level, to perform a 3-level switching power conversion, wherein the third voltage level is obtained by switching the conversion capacitor.

From another perspective, the present invention provides a power conversion circuit for use in a charger circuit having a switching power conversion mode and a capacitive power conversion mode, the charger circuit being configured to convert a first input power to a charging power at an output node to charge a battery, wherein the first input power includes an input voltage and an input current, the charger circuit including: a loop switch circuit coupled between a first node and the output node; a power loop transistor coupled between a second node and the output node; an inductor connected in series with the power loop transistor, and coupled between a third node and the second node; the power conversion circuit, coupled with the loop switch circuit at the first node, and coupled with a current inflow end of the inductor at the third node; and at least one conversion capacitor; the power conversion circuit including: a conversion switch circuit, including: an upper switch; a lower switch; and at least one auxiliary switch coupled with the upper switch and the lower switch; wherein each of the upper switch, the lower switch and the at least one auxiliary switch is coupled between at least two of the first input power, the first node, the third node and a ground node, and the at least one conversion capacitor is coupled to the conversion switch circuit; and a conversion control circuit, configured to operably generate a conversion switch control signal to control the conversion switch circuit, and generate a loop control signal to control the loop switch circuit and the power loop transistor; wherein, in the switching power conversion mode, the loop switch circuit is controlled to be OFF, and the conversion control circuit controls the upper switch, the lower switch and the at least one auxiliary switch, cycle by cycle repetitively, to conduct a current inflow end of the inductor to plural voltage levels in corresponding plural periods within each cycle, so as to convert the first input power to a switching output voltage at the second node by switching power conversion, and the conversion control circuit controls the conduction of the power loop transistor to convert the switching output voltage to the charging power; and wherein, in the capacitive power conversion mode, the loop switch circuit is controlled to be ON, and the conversion control circuit controls the upper switch, the lower switch and the at least one auxiliary switch, so that in plural charging conversion periods, the at least one conversion capacitor is periodically coupled between two of the following nodes: at least one voltage division node, the input power, and the ground node, so as to convert the input power to the charging power by capacitive power conversion, wherein the first node is coupled to one of the at least one voltage division node.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 2:
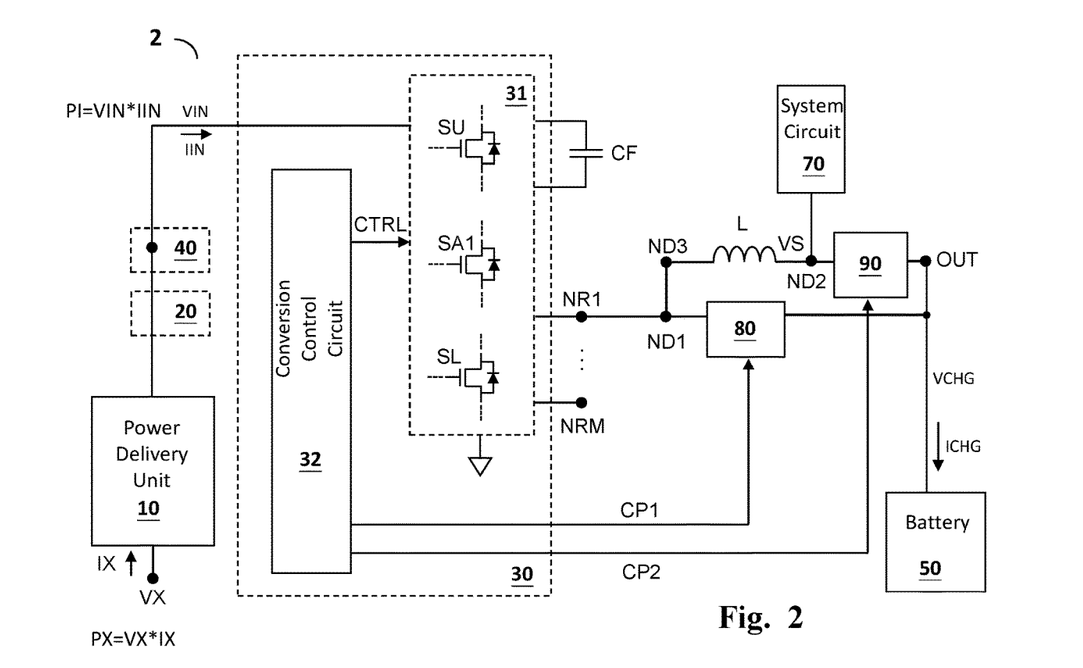
FIG. 2 shows an embodiment of the charger circuit according to the present invention; the charger circuit is operable in a switching power conversion mode and a capacitive power conversion mode.

FIG. 2 shows a charger circuit according to an embodiment of the present invention (charger circuit 2). The charger circuit 2 is operable in a switching power conversion mode and a capacitive power conversion mode. The charger circuit 2 converts an input power PI to generate a charging power at an output node OUT for charging a battery 50, wherein the input power PI includes an input voltage VIN and an input current IIN, and the charging power includes a charging voltage VCHG and a charging current ICHG. The charger circuit 2 includes a loop switch circuit 80, a power loop transistor 90, an inductor L, a power conversion circuit 30, and at least one conversion capacitor (such as but not limited to the conversion capacitor CF). The loop switch circuit 80 is coupled between a first node ND1 and the output node OUT; the power loop transistor 90 is coupled between a second node ND2 and the output node OUT; the inductor L is connected in series with the power loop transistor 90, and the inductor L is coupled between a third node ND3 and the second node ND2; the power conversion circuit 30 is coupled with the loop switch circuit 80 at the first node ND1, and is coupled with the inductor L at the third node ND3.

Still referring to FIG. 2, the power conversion circuit 30 includes a conversion switch circuit 31 and a conversion control circuit 32. The conversion switch circuit 31 includes an upper switch SU which is coupled to the input power PI; a lower switch SL which is coupled to a ground node; and at least one auxiliary switch (for example including the first auxiliary switch SA1 shown in the figure) which is coupled to the upper switch SU and the lower switch SL, wherein the upper switch SU, the lower switch SL, and the at least one auxiliary switch are coupled between the input power PI, the first node ND1, the third node ND3 and the ground node (that is, each of the upper switch SU, the lower switch SL, and the at least one auxiliary switch is coupled between at least two of the input power PI, the first node ND1, the third node ND3 and the ground node). The conversion control circuit 32 is configured to operably generate a conversion switch control signal CTRL to control the conversion switch circuit 31, and to operably generate a loop control signal CP (for example including CP1 and CP2) to control the loop switch circuit 80 and the power loop transistor 90. The at least one conversion capacitor CF is coupled to the conversion switch circuit 31.

According to the present invention, in switching power conversion mode, the loop switch circuit 80 is controlled to be OFF (not conductive), and the conversion control circuit 32 controls the upper switch SU, the lower switch SL and the at least one auxiliary switch, cycle by cycle repetitively, to conduct the inductor L to the input power PI in a conduction period, and to conduct the inductor L to the ground node in a non-conduction period, so as to convert the input power PI to a switching output voltage VS at the second node ND2 by switching power conversion, and the conversion control circuit 32 controls the conduction of the power loop transistor 90 to convert the switching output voltage VS to the charging power. The "switching power conversion" may be, for example but not limited to, buck, boost or buck-boost power conversion. In addition, the "switching power conversion" is not limited to a 2-level conversion (conducting the inductor L to the level of the input power PI or the level of the ground node), but may be a 3-level or more level conversion to further increase the power conversion efficiency. For example, the current inflow end of the inductor L switches between at least two of the input voltage VIN, the ground node and a third voltage level (wherein the third voltage level is obtained by switching the conversion capacitor CF). For details of such 3-level (or more level) switching power conversion, please refer to: "Analysis and Design Considerations of Integrated 3-Level Buck Converters, Xun Liu et. al,, IEEE TRANSACTIONS ON CIRCUITS AND SYSTEMS Vol. 63, No. 5, May 2016", which is not redundantly repeated here.

In addition, according to the present invention, in capacitive power conversion mode, the loop switch circuit 80 is controlled to be ON (conductive), and the conversion control circuit 32 controls the upper switch SU, the lower switch SL and the at least one auxiliary switch, so that in plural charging conversion periods, the at least one conversion capacitor CF is periodically coupled between two of the following nodes: at least one voltage division node (such as but not limited to NR1-NRM shown in the figure), the input power PI, and the ground node in a conduction period, so as to convert the input power PI to the charging power by capacitive power conversion, wherein the first node ND1 is coupled to one of at least one voltage division node (for example in the shown embodiment, ND1 is connected to NR1). In one embodiment, operating in capacitive power conversion mode, the level of the charging current ICHG is substantially equal to the level of the input current IIN multiplied by a predetermined current factor K, and in a preferred embodiment, K is a real number larger than 1, so that the charging current ICHG is higher than the input current IIN; in other words, the charger circuit according to present invention can charge the battery 50 by a high current even if the input current IIN is low, to greatly shorten the charging time. In one embodiment, the level of the charging voltage VCHG is substantially equal to the level of the input voltage VIN multiplied by a predetermined voltage ratio J, and in a preferred embodiment, K is a positive real number smaller than 1, so as to forma capacitive buck (step-down) voltage conversion. In one aspect, the power conversion circuit 30 operates as a divider charge pump in the capacitive power conversion mode. In this embodiment, the third node ND3 is directly connected to the first node ND1, but it is not necessarily so and can be otherwise in other embodiments.

Please note that, although it is intended to control the charging current ICHG to be equal to the level of the input current IIN multiplied by a predetermined current factor K, however due to non-idealities caused by for example imperfect manufacture of components or imperfect matching among components, the actual level of the charging current ICHG may not be exactly equal to K times IIN, but just close to K times, so the term "substantially" is used to express that there can be a reasonable range of tolerance, the same hereinafter when using "substantially" in other occasions. In addition, also please note that the current factor K changes according to the node(s) coupled to the charging power; in an embodiment wherein there is only one voltage division node, the current factor K is 2, i.e., the level of the charging current ICHG is substantially equal to the level of the input current IIN multiplied by 2, but in other embodiments, K is not limited to being an integer.

Still referring to FIG. 2, in one embodiment according to the present invention, each of the upper switch SU, the lower switch SL and the at least one auxiliary switch has an average current IAVG passing through; the average current IAVG is a function of the charging current ICHG, both in the switching power conversion mode and in the capacitive power conversion mode. In one aspect, the upper switch SU, the lower switch SL and the at least one auxiliary switch are used both in the switching power conversion mode and in the capacitive power conversion mode for charging/discharging the capacitor and for switching the inductor; or in another aspect, the upper switch SU, the lower switch SL and the at least one auxiliary switch operate directly or indirectly in a path of the charging current ICHG both in the switching power conversion mode and in the capacitive power conversion mode. Therefore, because at least some of the power switches are shared (commonly used) in different operation modes, the component cost is reduced.

Still referring to FIG. 2, in one embodiment, the charger circuit 2 according to the present invention preferably further includes a power delivery unit 10, which is configured to operably convert another input power PX to the input power PI, wherein the input power PX includes an input voltage VX and an input current IX. The power delivery unit 10 for example can be a power adaptor converting an AC power (corresponding to PX) to the input power PI, or a DC-DC power converter converting a battery power (corresponding to PX) in a power bank to the input power PI. In one embodiment, the power delivery unit 10 can output a constant current to support the direct charging mode, charging the battery 50 directly, bypassing the capacitive power conversion and the switching power conversion (for example, the conversion control circuit 32 operates the conversion switch circuit 31, the loop switch circuit 80 and the power loop transistor 90 to conduct a direct current path from the input power PI to the battery 50, or to the charging power). In one embodiment, the power delivery unit 10 regulates the input voltage VIN to a predetermined voltage level, or regulates the input current IIN to a predetermined current level. In one embodiment, in capacitive power conversion mode, when the power delivery unit 10 regulates the input current IIN to the predetermined current level, the charger circuit 2 operates to provide the charging current ICHG having a level which is substantially equal to the level of the input current IIN multiplied by the predetermined current factor K, whereby the battery 50 is charged by a high charging current ICHG to reduce the charging time.

Still referring to FIG. 2, in one embodiment, the charger circuit 2 according to the present invention can further include a connector or a connector and a cable (such as the cable 20 and the connector 40 shown in the figure), for coupling the power delivery unit 10 with the power conversion circuit 30, wherein the power delivery unit 10, the connector (such as 40) and the cable (such as 20) are compliant with the USB PD specification, and/or the USB type-C specification, and/or the USB quick charge specification. Note that in capacitive power conversion mode, the present invention can charge the battery by a high charging current (K fold of the input current IIN), but the input current IIN flowing through the cable is small, so a standard USB cable can be used, which is convenient to a user.

According to the present invention, in addition to charging the battery, the charger circuit can supply power to a system circuit. Referring to FIG. 2, in one embodiment, the charger circuit 2 for example can supply power (by the switching output voltage VS) to the system circuit 70 through the second node ND2. In one embodiment, in capacitive power conversion mode, the conversion control circuit 32 controls the power loop transistor 90 to supply power to the system circuit 70 through the second node ND2. The system circuit 70 for example can be a CPU in a mobile phone. In one embodiment, the power loop transistor 90 is controlled to be fully ON (fully conductive) such that the charging power is directly connected to the switching output voltage VS; in another embodiment, the conduction level of the power loop transistor 90 is controlled according to the voltage status of the battery 50 and the power requirement of the system circuit 70, which can be achieved for example by controlling the conduction resistance of the power loop transistor 90 or controlling the power loop transistor 90 to adjust the charging voltage VCHG or the charging current ICHG.

Figure 3A:
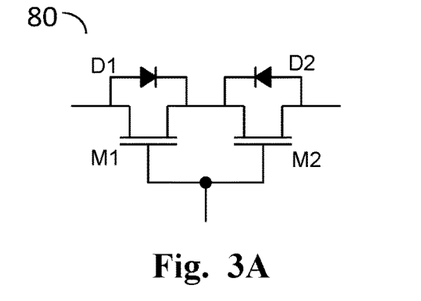
FIGS. 3A-3B show embodiments of a loop switch circuit in the charger circuit according to the present invention.
Figure 3B:
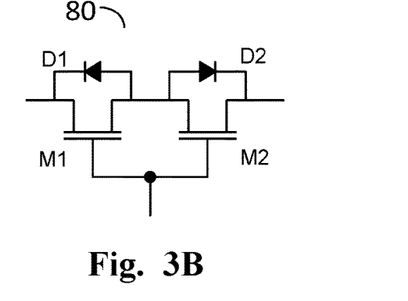

FIGS. 3A-3B show embodiments of a loop switch circuit (such as the loop switch circuit 80) in the charger circuit according to the present invention. As shown in FIGS. 3A and 3B, the loop switch circuit includes a pair of transistor switches (M1 and M2) having body diodes (D1 and D2) connected in opposite directions to block a reverse current; that is, the current outflow ends of the body diodes D1 and D2 can be close to each other (FIG. 3A) or far away from each other (FIG. 3B).

Figure 3C:
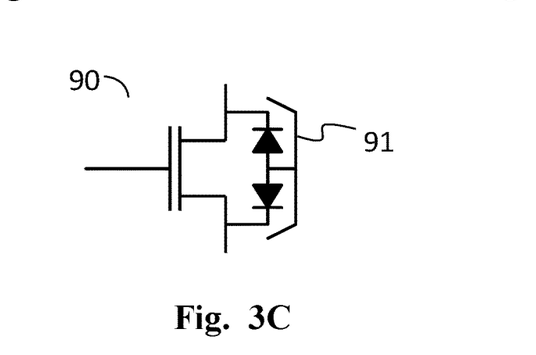
FIG. 3C shows an embodiment of a power loop transistor in the charger circuit according to the present invention.

FIG. 3C shows an embodiment of a power loop transistor (such as the power loop transistor 90) in the charger circuit according to the present invention. In one embodiment, the power loop transistor can include one single transistor; in another embodiment, the power loop transistor can include plural transistors. In one embodiment as shown in FIG. 3C, the power loop transistor 90 includes a switchable well 91, that is, the bias voltage level of the well 91 can be adaptively adjusted according to the drain-source voltage relationship or current direction of the power loop transistor 90, which for example can be achieved by coupling the well 91 to the drain or source of the power loop transistor 90.

Figure 4:
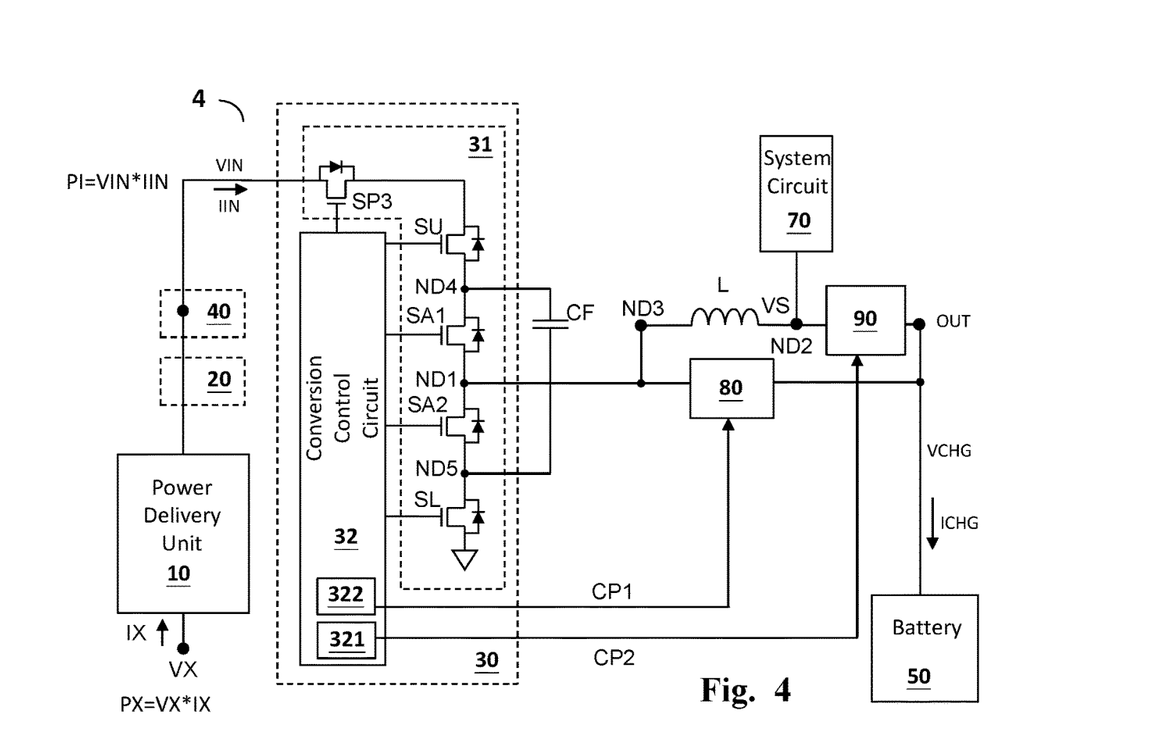
FIG. 4 shows a more specific embodiment of the charger circuit according to the present invention; the charger circuit is operable in a switching power conversion mode and a capacitive power conversion mode.

FIG. 4 shows a more specific embodiment of the charger circuit according to the present invention (charger circuit 4). In this embodiment, the at least one auxiliary switch includes a first auxiliary switch SA1 and a second auxiliary switch SA2, wherein the upper switch SU and the first auxiliary switch SA1 are connected in series and are coupled between the input power PI and the first node ND1, and the upper switch SU and the first auxiliary switch SA1 are connected with each other at a fourth node ND4; the lower switch SL and the second auxiliary switch SA2 are connected in series and are coupled between the first node ND1 and the ground node, and the lower switch SL and the second auxiliary switch SA2 are connected with each other at a fifth node ND5; the conversion capacitor CF is coupled between the fourth node ND4 and the fifth node ND5. In this embodiment, the third node ND3 is directly connected to the first node ND1. The plural conversion periods include a first conversion period and a second conversion period, and in capacitive power conversion mode, the conversion control circuit 32 controls the conversion switch circuit 31 (including the upper switch SU, the lower switch SL and the auxiliary switches SA1 and SA2), such that a first end of the conversion capacitor CF (i.e. the fourth node ND4) is electrically connected to the input voltage VIN and the first node ND1 in the first and second conversion periods, respectively, and a second end of the conversion capacitor CF (i.e. the fifth node ND5) is electrically connected to the first node ND1 and the ground node in the first and second conversion periods, respectively, such that the charging current ICHG is substantially twice of the input current IIN.

In this embodiment, the first node ND1 corresponds to one of the voltage division nodes (such as the voltage division node NR1 in FIG. 3). In this embodiment, the first node ND1 is directly connected to the third node ND3, but it is not necessarily so and can be otherwise in other embodiments. Note that in the embodiment wherein the third node ND3 is directly connected to the first node ND1, in capacitive power conversion mode, when the circuit is in stable state, the voltage level at the third node ND3 does not vary drastically (such as switching between two levels), i.e., the voltage level at the third node ND3 is substantially a constant DC level, whereby it does not cause the inductor L to generate an undesired current.

Still referring to FIG. 4, in one embodiment, in switching power conversion mode, the charger circuit 4 also makes use of the conversion capacitor (such as CF) to perform 3-level or more level switching power conversion to enhance the power conversion efficiency in the switching power conversion mode. The rest of the operations of the charger circuit 4 are similar to the charger circuit 2, and are not redundantly repeated here.

Still referring to FIG. 4, in one embodiment, the conversion control circuit 32 includes a power loop control circuit 321, which is configured to operably generate the loop control signal CP2 to control the power loop transistor 90. In one embodiment, the conversion control circuit 32 includes a direct charging control circuit 322, which is configured to operably generate the loop control signal CP1 to control the loop switch circuit 80.

Still referring to FIG. 4, in one embodiment, the conversion switch circuit 31 further includes a loop switch SP3, for controlling whether to conduct the input power PI; in this embodiment, the loop switch SP3 includes a transistor having a body diode whose current flowing direction is opposite to at least one of the body diodes of the other switches in the conversion switch circuit 31, to block a reverse current.

Figure 5A:
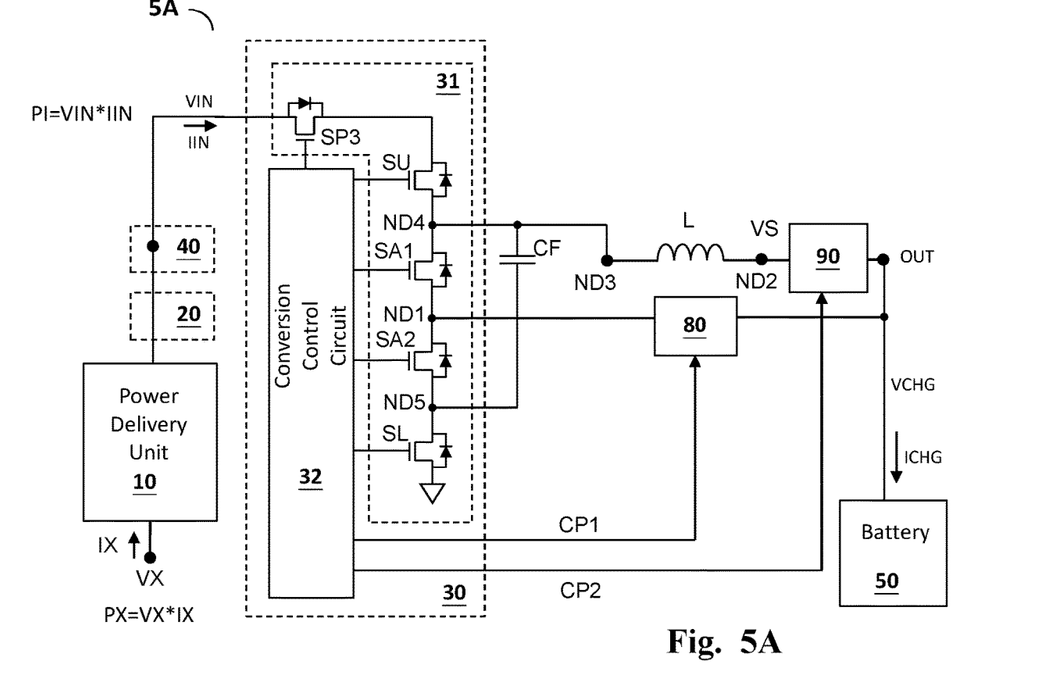
FIGS. 5A-5B show two more specific embodiments of the charger circuit according to the present invention; the charger circuit is operable in a switching power conversion mode and a capacitive power conversion mode.
Figure 5B:
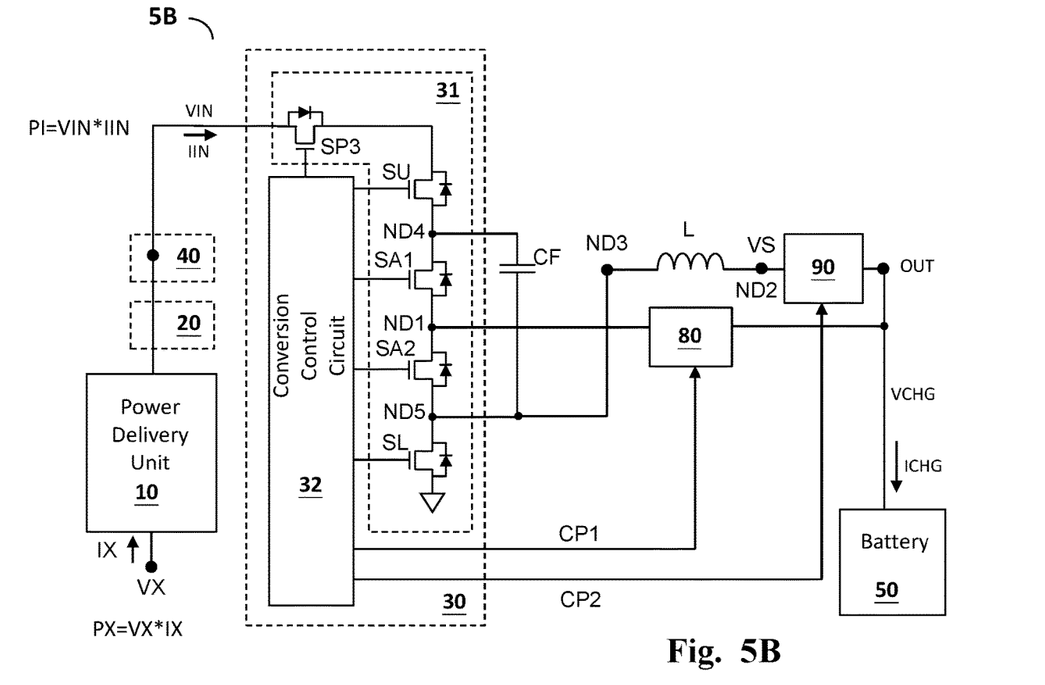

FIGS. 5A-5B show two more specific embodiments of the charger circuit according to the present invention (charger circuits 5A and 5B). In one embodiment, the third node ND3 can be directly connected to the fourth node ND4 or the fifth node ND5, and the charger circuits can still perform the required operations to achieve the desired functions. More specifically, the charger circuits 5A and 5B operate similarly to the embodiment of FIG. 4 in the capacitive power conversion mode, while in the switching power conversion mode, in the charger circuit 5A, the auxiliary switches SA1 and SA2 and the lower switch SL can be regarded as one lower switch, operating together with the upper switch SU to perform a 2-level switching power conversion; and in the charger circuit 5b, the auxiliary switches SA1 and SA2 and the upper switch SU can be regarded as one upper switch, operating together with the lower switch SL to perform a 2-level switching power conversion.

Figure 6:
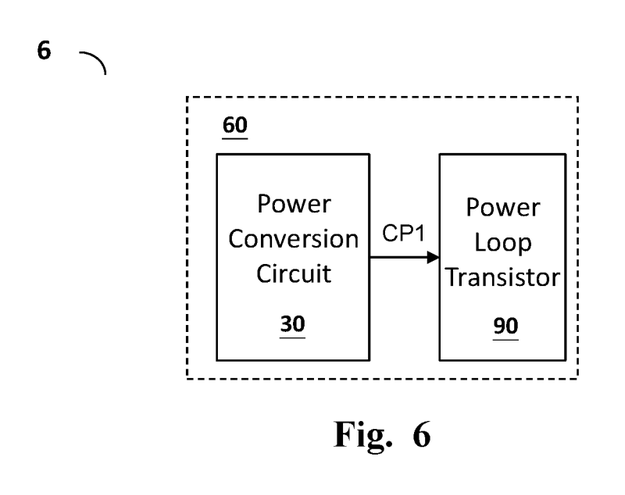
FIG. 6 shows an embodiment of a power loop transistor and a power conversion circuit in the charger circuit according to the present invention.

FIG. 6 shows an embodiment of a charger circuit according to the present invention (charger circuit 6), wherein the power loop transistor 90 and the power conversion circuit 30 are integrated in an integrated circuit (IC) chip and packaged in an IC package 60. However, the present invention is not limited to this arrangement; in another embodiment, at least one or both of the loop switch circuit and the power loop transistor, are integrated with the power conversion circuit 30 in an IC chip and/or packaged in an IC package.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, only one conversion capacitor CF is shown in the aforementioned embodiments, but the number of the conversion capacitors can be plural, which provides an advantage of reducing the output ripple in the charging voltage and the charging current. For another example, the switches in the conversion switch circuit are connected in series in the shown embodiments, but the present invention is not limited to this arrangement; the switches can be connected in parallel or in a mixed arrangement of parallel and series. For another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A charger circuit having a switching power conversion mode and a capacitive power conversion mode, and configured to convert a first input power to a charging power at an output node to charge a battery, wherein the first input power includes an input voltage and an input current, the charger circuit comprising:
   a loop switch circuit coupled between a first node and the output node;
   a power loop transistor coupled between a second node and the output node;
   an inductor connected in series with the power loop transistor, and coupled between a third node and the second node;
   a power conversion circuit coupled with the loop switch circuit at the first node, and coupled with a current inflow end of the inductor at the third node, the power conversion circuit including:
      a conversion switch circuit, including:
         an upper switch;
         a lower switch; and at least one auxiliary switch coupled with the upper switch and the lower switch;

wherein each of the upper switch, the lower switch and the at least one auxiliary switch is coupled between at least two of the first input power, the first node, the third node and a ground node; and a conversion control circuit, configured to operably generate a conversion switch control signal to control the conversion switch circuit, and generate a loop control signal to control the loop switch circuit and the power loop transistor; and at least one conversion capacitor, coupled to the conversion switch circuit;

wherein, in the switching power conversion mode, the loop switch circuit is controlled to be OFF, and the conversion control circuit controls the upper switch, the lower switch and the at least one auxiliary switch, cycle by cycle repetitively, to conduct a current inflow end of the inductor to plural voltage levels in corresponding plural periods within each cycle, so as to convert the first input power to a switching output voltage at the second node by switching power conversion, and the conversion control circuit controls the conduction of the power loop transistor to convert the switching output voltage to the charging power; and wherein, in the capacitive power conversion mode, the loop switch circuit is controlled to be ON, and the conversion control circuit controls the upper switch, the lower switch and the at least one auxiliary switch, so that in plural charging conversion periods, the at least one conversion capacitor is periodically coupled between two of the following nodes: at least one voltage division node, the input power, and the ground node, so as to convert the input power to the charging power by capacitive power conversion, wherein the first node is coupled to one of the at least one voltage division node;

wherein the at least one auxiliary switch includes a first auxiliary switch and a second auxiliary switch;

the upper switch and the first auxiliary switch are connected in series and are coupled between the input power and the first node, wherein the upper switch and the first auxiliary switch are connected with each other at a fourth node;

the lower switch and the second auxiliary switch are connected in series and are coupled between the first node and the ground node, wherein the lower switch and the second auxiliary switch are connected with each other at a fifth node;

the conversion capacitor is coupled between the fourth node and the fifth node;

the third node is directly connected to the first, fourth or fifth node;

the plural charging conversion periods include a first conversion period and a second conversion period, and in the capacitive power conversion mode, the conversion control circuit controls the conversion switch circuit, such that a first end of the conversion capacitor is electrically connected to the input voltage and the first node in the first and second conversion periods, respectively, and a second end of the conversion capacitor is electrically connected to the first node and the ground node in the first and second conversion periods, respectively, such that the charging current is substantially twice of the input current.

2. The charger circuit according to claim 1, further comprising a power delivery unit configured to operably convert a second input power to the first input power, wherein the power delivery unit regulates the input voltage at a predetermined voltage level, or regulates the input current at a predetermined current level.

3. The charger circuit according to claim 2, further comprising a connector or further comprising a connector and a cable, for coupling the power delivery unit with the power conversion circuit, wherein the power delivery unit, the connector and the cable are compliant with a USB PD specification, and/or a USB type-C specification, and/or a USB quick charge specification.

4. The charger circuit according to claim 1, wherein each of the upper switch, the lower switch and the at least one auxiliary switch has an average current passing through, and the average current is a function of the charging current, both in the switching power conversion mode and in the capacitive power conversion mode.

5. The charger circuit according to claim 1, wherein the first node and the third node are directly connected with each other.

6. The charger circuit according to claim 1, wherein the third node is directly connected to the first node, and wherein in the capacitive power conversion mode, when the circuit is in stable state, a voltage level at the third node is substantially a constant DC level.

7. The charger circuit according to claim 1, wherein at least one or both of the loop switch circuit and the power loop transistor, are integrated with the power conversion circuit in an integrated circuit chip and/or packaged in an integrated circuit package.

8. The charger circuit according to claim 1, wherein in a direct charging mode, the conversion control circuit operates the conversion switch circuit, the loop switch circuit and the power loop transistor, to conduct a direct current path from the first input power to the charging power.

9. The charger circuit according to claim 1, wherein in the switching power conversion mode, a current inflow end of the inductor switches between the input voltage and the ground node, to perform a 2-level switching power conversion.

10. The charger circuit according to claim 1, wherein the third node is directly connected to the first node, and wherein in the switching power conversion mode, a current inflow end of the inductor switches among the input voltage, the ground node and a third voltage level, to perform a 3-level switching power conversion, wherein the third voltage level is obtained by switching the conversion capacitor.

11. The charger circuit according to claim 1, wherein in the switching power conversion mode, a current inflow end of the inductor switches among the input voltage, the ground node and a third voltage level, to perform a 3-level switching power conversion, wherein the third voltage level is obtained by switching the conversion capacitor.

12. A power conversion circuit for use in a charger circuit having a switching power conversion mode and a capacitive power conversion mode, the charger circuit being configured to convert a first input power to a charging power at an output node to charge a battery, wherein the first input power includes an input voltage and an input current, the charger circuit including: a loop switch circuit coupled between a first node and the output node; a power loop transistor coupled between a second node and the output node; an inductor connected in series with the power loop transistor, and coupled between a third node and the second node; the power conversion circuit, coupled with the loop switch circuit at the first node, and coupled with a current inflow end of the inductor at the third node; and at least one conversion capacitor; the power conversion circuit comprising:
- a conversion switch circuit, including:
  - an upper switch;
  - a lower switch; and
  - at least one auxiliary switch coupled with the upper switch and the lower switch;
  - wherein each of the upper switch, the lower switch and the at least one auxiliary switch is coupled between at least two of the first input power, the first node, the third node and a ground node, and the at least one conversion capacitor is coupled to the conversion switch circuit; and
- a conversion control circuit, configured to operably generate a conversion switch control signal to control the conversion switch circuit, and generate a loop control signal to control the loop switch circuit and the power loop transistor;
- wherein, in the switching power conversion mode, the loop switch circuit is controlled to be OFF, and the conversion control circuit controls the upper switch, the lower switch and the at least one auxiliary switch, cycle by cycle repetitively, to conduct a current inflow end of the inductor to plural voltage levels in corresponding plural periods within each cycle, so as to convert the first input power to a switching output voltage at the second node by switching power conversion, and the conversion control circuit controls the conduction of the power loop transistor to convert the switching output voltage to the charging power; and
- wherein, in the capacitive power conversion mode, the loop switch circuit is controlled to be ON, and the conversion control circuit controls the upper switch, the lower switch and the at least one auxiliary switch, so that in plural charging conversion periods, the at least one conversion capacitor is periodically coupled between two of the following nodes: at least one voltage division node, the input power, and the ground node, so as to convert the input power to the charging power by capacitive power conversion, wherein the first node is coupled to one of the at least one voltage division node;
- wherein the at least one auxiliary switch includes a first auxiliary switch and a second auxiliary switch;
- the upper switch and the first auxiliary switch are connected in series and are coupled between the input power and the first node, wherein the upper switch and the first auxiliary switch are connected with each other at a fourth node;
- the lower switch and the second auxiliary switch are connected in series and are coupled between the first node and the ground node, wherein the lower switch and the second auxiliary switch are connected with each other at a fifth node;
- the conversion capacitor is coupled between the fourth node and the fifth node;
- the third node is directly connected to the first, fourth or fifth node;
- the plural charging conversion periods include a first conversion period and a second conversion period, and in the capacitive power conversion mode, the conversion control circuit controls the conversion switch circuit, such that a first end of the conversion capacitor is electrically connected to the input voltage and the first node in the first and second conversion periods, respectively, and a second end of the conversion capacitor is electrically connected to the first node and the ground node in the first and second conversion periods, respectively, such that the charging current is substantially twice of the input current.

13. The power conversion circuit according to claim 12, wherein the charger circuit further includes a power delivery unit configured to operably convert a second input power to the first input power, wherein the power delivery unit regulates the input voltage at a predetermined voltage level, or regulates the input current at a predetermined current level.

14. The power conversion circuit according to claim 12, wherein each of the upper switch, the lower switch and the at least one auxiliary switch has an average current passing through, and the average current is a function of the charging current, both in the switching power conversion mode and in the capacitive power conversion mode.

15. The power conversion circuit according to claim 12, wherein the first node and the third node are directly connected with each other.

16. The power conversion circuit according to claim 12, wherein the third node is directly connected to the first node, and wherein in the capacitive power conversion mode, when the circuit is in stable state, a voltage level at the third node is substantially a constant DC level.

17. The power conversion circuit according to claim 12, wherein at least one or both of the loop switch circuit and the power loop transistor, are integrated with the power conversion circuit in an integrated circuit chip and/or packaged in an integrated circuit package.

18. The power conversion circuit according to claim 12, wherein in a direct charging mode, the conversion control circuit operates the conversion switch circuit, the loop switch circuit and the power loop transistor, to conduct a direct current path from the first input power to the charging power.

19. The power conversion circuit according to claim 12, wherein in the switching power conversion mode, a current inflow end of the inductor switches between the input voltage and the ground node, to perform a 2-level switching power conversion.

20. The power conversion circuit according to claim 12, wherein the third node is directly connected to the first node, and wherein in the switching power conversion mode, a current inflow end of the inductor switches among the input voltage, the ground node and a third voltage level, to perform a 3-level switching power conversion, wherein the third voltage level is obtained by switching the conversion capacitor.

21. The power conversion circuit according to claim 12, wherein in the switching power conversion mode, a current inflow end of the inductor switches among the input voltage, the ground node and a third voltage level, to perform a 3-level switching power conversion, wherein the third voltage level is obtained by switching the conversion capacitor.

* * * * *